United States Patent Office 3,649,691
Patented Mar. 14, 1972

3,649,691
DL - 5 - [3-(TERT-BUTYLAMINO)-2-HYDROXY-PROPOXY] - 3,4 - DIHYDRO - 1(2H) NAPH-THALENONE
John Shavel, Jr., Mendham, and Charles F. Schwender, Far Hills, N.J., assignors to Warner-Lambert Company, Morris Plains, N.J.
No Drawing. Filed Sept. 17, 1969, Ser. No. 859,244
Int. Cl. C07c 93/06
U.S. Cl. 260—570.7
4 Claims

ABSTRACT OF THE DISCLOSURE

A process for the resolution of DL-5-[3-(tert-butylamino) - 2-hydroxypropoxy]-3,4-dihydro-1(2H)naphthalenone into a (+) isomer and a (−) isomer according to the following schematic diagram:

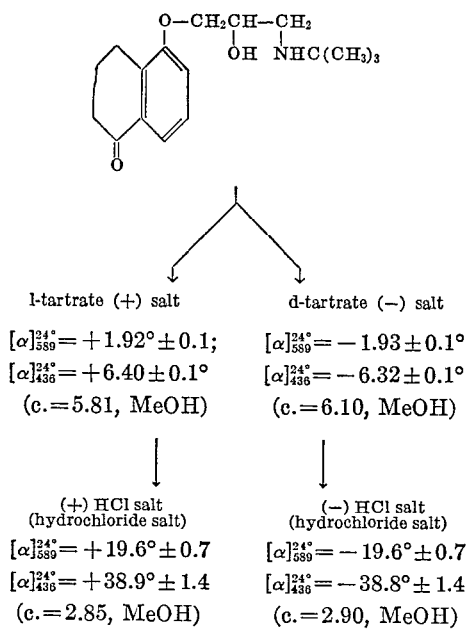

l-tartrate (+) salt
$[\alpha]_{589}^{24°} = +1.92° \pm 0.1$;
$[\alpha]_{436}^{24°} = +6.40° \pm 0.1°$
(c.=5.81, MeOH)

d-tartrate (−) salt
$[\alpha]_{589}^{24°} = -1.93 \pm 0.1°$
$[\alpha]_{436}^{24°} = -6.32 \pm 0.1°$
(c.=6.10, MeOH)

(+) HCl salt
(hydrochloride salt)
$[\alpha]_{589}^{24°} = +19.6° \pm 0.7$
$[\alpha]_{436}^{24°} = +38.9° \pm 1.4$
(c.=2.85, MeOH)

(−) HCl salt
(hydrochloride salt)
$[\alpha]_{589}^{24°} = -19.6° \pm 0.7$
$[\alpha]_{436}^{24°} = -38.8° \pm 1.4$
(c.=2.90, MeOH)

The (−) isomer thus obtained is about sixty times more potent as a β-adrenergic blocking agent that the (+) isomer and about twice the potency of the racemate.

The present invention relates to a novel process for the optical resolution of DL-5-[3-(tert-butylamino)-2-hydroxypropoxy]-3,4-dihydro-1(2H)naphthalenone having the following structural formula:

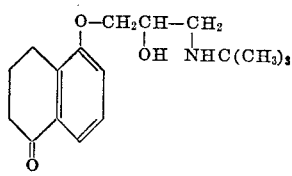

into its (−) and (+) isomers. The (−) isomer is about sixty times more potent as a β-adrenergic blocking agent than the (+) isomer and about twice the potency of the racemate (±). The above compound is an important β-adrenergic blocking agent; its preparation and use is more fully described in copending application U.S. Ser. No. 761,857, filed Sept. 23, 1968; a copy of this application is attached hereto to complete the disclosure.

According to the present invention, we provide a novel process whereby this therapeutically important agent is further resolved into its optically active components.

Broadly speaking, the hydrochloride salt may be conveniently used as the starting material. The DL-hydrochloride salt is converted to the free base by treating with a base, e.g., alkali metal hydroxides, preferably sodium hydroxide, employing chloroform as the solvent. The free base is then converted to the l-tartrate salt by treating with l-tartaric acid. The l-tartrate (+) salt has the following optical rotation in methanol:

$$[\alpha]_{589}^{24°} = +1.92 \pm 0.1;\ [\alpha]_{436}^{24°} = +6.40° \pm 0.1°$$

The free base is recovered by treating the l-tartrate (+) salt as obtained above with a base, e.g., an alkali metal hydroxide, the (+) hydrochloride salt of this base in methanol has the following optical rotation characteristics:

$$[\alpha]_{589}^{24°} = +19.6° \pm 0.7;\ [\alpha]_{436}^{24°} = +3.89° \pm 1.4°$$

The mother liquor remaining from the isolation of the l-tartrate (+) salt is evaporated in vacuo to obtain a solid which is partitioned between a chloroform-sodium or potassium hydroxide mixture to obtain the corresponding free base. To the free base thus obtained is added d-tartaric acid to obtain the corresponding d-tartrate (−) salt. The desired d-tartrate (−) salt has the following optical rotation:

$$[\alpha]_{589}^{24°} = -1.93° \pm 0.1°;\ [\alpha]_{436}^{24°} = -6.32° \pm 0.1°$$

(c.=6.10, methanol)

The desired and therapeutically more active (−) isomer is obtained by treating the d-tartrate (−) salt with a chloroform-sodium or potassium hydroxide mixture. A solution of this (−) isomer hydrochloride salt in methanol has the following optical rotation:

$$[\alpha]_{589}^{24°} = -19.6° \pm 0.7°;\ [\alpha]_{436}^{24°} = -38.8° \pm 1.4°$$

(c.=2.90, methanol)

The (−) or (+) isomer can be used as a β-blocking agent in an analogous fashion as the racemate, but since the (−) isomer is more potent, less amount is required for the same effect than the (+) isomer or the racemate. Thus, for example, in order to achieve β-adrenergic blocking activity in a mammalian host, such as dogs, cats, monkeys, and the like, an oral or parenteral dose of 0.05 mg. to 0.1 mg./kg. of the (−) isomer, two or three times daily is recommended. Among the conditions in which these compounds are useful are, for example, angina pectoris, cardiac arrythmia and other ischemic states.

The compounds of our invention may be converted into their pharmaceutically acceptable non-toxic acid addition salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques.

The following examples are included in order further to illustrate the invention:

EXAMPLE 1

The optical resolution of DL - 5 - [3-(tert-butylamino)-2-hydroxypropoxy] - 3,4 - dihydro-1(2H)-naphthalenone hydrochloride The DL-salt (140 g. 0.427 mole) is converted to its free base form by suspending the salt in a chloroform 5% NaOH mixture. A quantitative yield of the base is obtained from the chloroform phase.

Into a solution of 84.0 g. (0.560 mole) of $l$-tartaric acid in 400 ml. of ethanol (95%) is dissolved 0.427 mole of the free base form of the DL-mixture. The solution is allowed to cool slowly to room temperature. A crystalline precipitate forms which is obtained in maximum yield by cooling to 0° before collection by filtration; yield, 93.6 g. (47.8%) M.P. 125–135°.

$$[\alpha]_{589}^{25°} = -0.16° \ (c.=5.60, \text{MeOH})$$

The crystalline $l$-tartrate salt is recrystallized seven times from ethanol containing 1% $l$-tartaric acid and gives a white crystalline salt possessing constant melting and specific rotation values; yield, 63.3 g. (32.3%) M.P. 125–135°.

$$[\alpha]_{589}^{24°} = +1.92 \pm 0.1; \quad [\alpha]_{436}^{24°} = +6.40° \pm 0.1° \ (c.=5.81 \text{ methanol})$$

$\bar{\gamma}$ in cm.$^{-1}$ (Nujol): 3350, 3500 (OH); 2400 (acidic hydrogen); 1730 (C=O, acid); 1685 (C=O, ketone); 1660, 1595, 1580 (COO—, NH$_2^+$, C=C).

Analysis.—Calcd. for $C_{17}H_{25}NO_3 \cdot C_4H_6O_6 \cdot H_2O$ (percent): C, 54.89; H, 7.24; N, 3.05. Found (percent): C, 54.99; H, 7.26; N, 3.29.

EXAMPLE 2

(+)5-[3-tert-butylamino)-2-hydroxypropoxy]-3,4-dihydro-1(2H)-naphthalenone hydrochloride A suspension of 60.0 g. (130 moles) of the $l$-tartrate (+) salt in 1 l. CHCl$_3$ and 0.5 l. 5% NaOH, is stirred at room temperature for 2 hours. The chloroform phase, upon drying with anhydrous magnesium sulfate, gives the free base form as an oil. This material is converted to its HCl salt; yield, 39.5 g. (92.5%) M.P. 208–210°. The product is recrystallized twice from methanol-ether and gives a white crystalline product of constant melting and rotating values; yield, 23.4 g. (54.8%) M.P. 209–211°.

$$[\alpha]_{589}^{24°} = +19.60° \pm 0.7; \quad [\alpha]_{436}^{24°} = 38.9° \pm 1.4° \ (c.=2.85, \text{methanol})$$

$\bar{\gamma}$ in cm.$^{-1}$ (KBr): 3425 (OH); 2700–2400 (acidic hydrogen); 1680 (C=O), 1590 (C=C).

$\lambda_{\text{max.}}^{\text{EtOH}}$, m$\mu$ ($\epsilon$): 221 (24,500); 253 (8900); 310 (2280)

A second crop of 16.1 g. of (+) isomer from the filtrates gives an overall yield of (+) isomer from racemic mixture of 28.2%.

Analysis.—Calcd. for $C_{17}H_{25}NO_3 \cdot HCl$ (percent): C, 62.28; H, 7.99; N, 4.27; Cl, 10.83. Found (percent): C, 62.05; H, 7.90; N, 4.41; Cl, 11.08, 11.11.

EXAMPLE 3

(—)5-[3-(tert-butylamino)-2-hydroxypropoxy]-3,4-dihydro-1(2H)-naphthalenone $l$-tartrate The mother liquor containing the remaining 52.2% of $l$-tartrate salt is evaporated in vacuo and residual solid obtained is partitioned between 1 l. CHCl$_3$ and 0.5 l. 5% NaOH. The chloroform phase gives a quantitative yield of the free base after drying with anhydrous magnesium sulfate and evaporating in vacuo to the residual free base form.

An ethanolic solution (500 ml.) containing 84.0 g. (560 moles) of $d$-tartaric acid and 0.223 mole of free base enriched in (—) isomer is allowed to cool slowly to room temperature and then to 0° for maximum precipitation, the crystalline $d$-tartrate salt is collected by filtration and 79.4 g. (40.3%) M.P. 120–135° of the solid is obtained. After several recrystallizations of the salt from 95% ethanol containing 1% of $d$-tartaric acid, constant rotating and melting material is obtained as a white crystalline solid; yield, 66.1 g. (33.8%) M.P. 125–135°.

$$[\alpha]_{589}^{24°} = -1.93° \pm 0.1°; \quad [\alpha]_{436}^{24°} = -6.32° \pm 0.1° \ (c.=6.10, \text{methanol})$$

$\bar{\gamma}$ in cm.$^{-1}$ (Nujol): 3350, 3500 (OH); 2400 (acidic hydrogen); 1730 (C=O, acid); 1685 (C=O, ketone); 1660, 1595, 1580 (COO—, NH$_2^+$, C=C).

Analysis.—Calcd. for $C_{17}H_{25}NO_3 \cdot C_4H_6O_6 \cdot H_2O$ (percent): C, 54.89; H, 7.24; N, 3.05. Found (percent): C, 54.85; H, 7.17, 7.14; N, 3.25.

EXAMPLE 4

(—)5-[3-(tert-butylamino)-2-hydroxypropoxy]-3,4-dihydro-1(2H)naphthalenone hydrochloride A mixture of 63.0 g. (137 moles) of $d$-tartrate (—) salt in 1 l. CHCl$_3$ and 0.5 l. 5% NaOH is stirred at room temperature for 2 hours. The free base form of (—) isomer is obtained in a quantitative yield by drying and evaporating the chloroform phase to a residual oily material. The oil is converted to the solid hydrochloride salt; yield, 41.8 g. (92.9%) M.P. 208–210°. Recrystallization from methanol-ether gives white crystalline material of constant melting and rotation values; yield, 25.1 g. (55.8%) M.P. 209–211°. A second crop of 16.1 g. of essentially pure (—) isomer is obtained from the filtrate to give an overall yield of (—) isomer of 29.7% from the racemic mixture.

$$[\alpha]_{589}^{24°} = -19.6° \pm 0.7; \quad [\alpha]_{436}^{24°} = -38.8° \pm 1.4° \ (c.=2.90, \text{methanol})$$

$\bar{\gamma}$ in cm.$^{-1}$ (KBr): 3400 (OH); 2700, 2400 (acidic hydrogen); 1685 (C=O); 1585 (C=C). $\lambda_{\text{max.}}^{\text{EtOH}}$ m$\mu$ ($\epsilon$): 221 (24,700); 253 (9000); 310 (2400).

Analysis.—Calcd. for $C_{17}H_{25}NO_3 \cdot HCl$ (percent): C, 62.28; H, 7.99; N, 4.27; Cl, 10.83. Found (percent): C, 62.47; H, 8.03; N, 4.16; Cl, 10.72 and 10.84.

EXAMPLE 5

The following examples will illustrate the $\beta$-blocking activity of the (—) isomer, the (+) isomer and the racemate:

Mongrel dogs of either sex (10.1–13.6 kg.) were anesthetized with barbital sodium (300 mg./kg., i.v.) and titrated to the level of surgical anesthesia with pentobarbital. Aortic blood pressure, heart rate, and contractile force (Walton-Brodie strain gauge arch sutured to left ventricle) were measured. The dogs were bilaterally vagotomized and maintained on artificial respiration. Control responses to isoproterenol (0.3 $\mu$g./kg.) were established after which (+) isomer and (—) isomer were administered intravenously in doses of 1 5 $\mu$g./kg. and thereafter in twofold increments. Isoproterenol was given after each dose of the $\beta$-blocking agents, and the sequence continued until approximately 80% blockade of the induced tachycardias was achieved. A cumulative dose of 36 $\mu$g./kg. of (—) isomer relative to a dose of 2,256 $\mu$g./kg. of (+) isomer was required to produce approximately equal 80% blockade of both the (+) isomer or the racemate. The (—) isomer is roughly sixty times more potent than the corresponding (+) isomer and about twice the potency of the racemate.

The compounds described herein are named as 5-[3-(tert - butylamino) - 2 - hydroxypropoxy]-3,4-dihydro-1 (2H)naphthalenone. They can also alternatively be named as 5-[3-(tert-butylamino)-2-hydroxypropoxy]tetralones which is the nomenclature used in copending U.S. patent application Ser. No. 761,857, filed Sept. 23, 1968.

We claim:

1. (−) 5-[3-(tert-butylamino)-2-hydroxypropoxy]-3,4-dihydro-1(2H)naphthalenone, and its non-toxic pharmaceutically acceptable acid addition salts.

2. A compound according to claim 1 wherein said salt is the hydrochloride salt.

3. (+) 5-[3-(tert-butylamino)-2-hydroxypropoxy]-3,4-dihydro-1(2H)naphthalenone, and its non-toxic pharmaceutically acceptable acid addition salts.

4. A compound according to claim 3 wherein said salt is the hydrochloride salt.

References Cited

UNITED STATES PATENTS

| | | | |
|---|---|---|---|
| 2,773,901 | 12/1956 | Larsen et al. | 260—570.8 |
| 2,841,609 | 7/1958 | Larsen et al. | 260—570 X |
| 3,432,545 | 3/1969 | Howe | 260—501.17 |
| 3,483,221 | 12/1969 | Wilhelm et al. | 260—570.7 X |

FOREIGN PATENTS

| | | | |
|---|---|---|---|
| 768,772 | 2/1957 | Great Britain | 260—570.8 |

ROBERT V. HINES, Primary Examiner

U.S. Cl. X.R.

260—501.18

UNITED STATES PATENT AND TRADEMARK OFFICE

CERTIFICATE EXTENDING PATENT TERM
UNDER 35 U.S.C. 156

Patent No.    : 3,649,691

Dated         : March 14, 1972

Inventor(s)   : John Shavel, Jr., et al

Patent Owner  : Warner-Lambert Company

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this <u>Nineteenth</u> day of <u>December 1986</u>.

Donald J. Quigg

Assistant Secretary and Commissioner of Patents and Trademarks